(12) United States Patent
Henderson

(10) Patent No.: US 7,484,457 B2
(45) Date of Patent: Feb. 3, 2009

(54) METHOD AND APPARATUS FOR REMOVING GREASE AND EXCESS LIQUID FROM MEAT

(76) Inventor: Michael W. Henderson, 4461 67th Ave. North, Pinellas Park, FL (US) 33781

( * ) Notice: Subject to any disclaimer, the term of this patent is extended or adjusted under 35 U.S.C. 154(b) by 722 days.

(21) Appl. No.: 11/100,062

(22) Filed: Apr. 6, 2005

(65) Prior Publication Data

US 2006/0225583 A1 Oct. 12, 2006

(51) Int. Cl.
*A47J 43/28* (2006.01)
(52) U.S. Cl. .................. 99/495; 100/116; 100/125; 99/485
(58) Field of Classification Search ............... None
See application file for complete search history.

(56) References Cited

U.S. PATENT DOCUMENTS

| | | | |
|---|---|---|---|
| 755,126 A * | 3/1904 | Furst ................. | 100/127 |
| 782,618 A * | 2/1905 | Minyard ............. | 100/125 |
| 1,168,544 A * | 1/1916 | Newlin .............. | 248/94 |
| 1,432,754 A | 10/1922 | Hollowell | |
| 1,469,114 A * | 9/1923 | Simpson et al. ..... | 100/125 |
| 1,680,816 A | 8/1928 | Spaulding | |
| 2,173,733 A * | 9/1939 | Seybert .............. | 100/125 |
| 2,338,251 A * | 1/1944 | Makino .............. | 99/322 |
| 2,583,335 A | 1/1952 | Jepson | |
| 4,206,856 A | 6/1980 | Lobel et al. | |
| 4,209,916 A * | 7/1980 | Doyel ............... | 99/495 |
| 4,958,557 A | 9/1990 | Fiala | |
| 5,320,031 A | 6/1994 | Whitney | |
| 5,419,250 A | 5/1995 | Ferguson | |
| 5,453,189 A * | 9/1995 | Joergensen .......... | 99/297 |
| 5,701,810 A * | 12/1997 | Nakai ................ | 99/495 |
| 5,826,494 A | 10/1998 | Wang | |
| 5,904,090 A * | 5/1999 | Lillelund et al. ...... | 99/495 |
| 6,196,122 B1 * | 3/2001 | Lai .................. | 99/495 |
| 6,672,204 B2 * | 1/2004 | Fiorello ............. | 99/495 |
| 6,711,992 B1 | 3/2004 | McLemore | |
| 7,152,520 B2 * | 12/2006 | Kerner .............. | 99/495 |
| 7,194,951 B1 * | 3/2007 | Porter ............... | 100/116 |
| 2006/0207441 A1 * | 9/2006 | Mulhauser et al. ..... | 99/495 |

* cited by examiner

*Primary Examiner*—Joseph M Pelham
(74) *Attorney, Agent, or Firm*—Larson & Larson; Frank Liebenow; Herbert Larson

(57) ABSTRACT

A method and apparatus for removing grease from meat includes a mesh basket for holding the partially cooked meat, a pressure plate for exerting a sustained force on the meat within the mesh basket, one or more spacers for placing on top of the pressure plate, a container for holding the mesh basket with the one or more spacers partially extending beyond an opening in the container and a lid that can be pressed onto the container, sealing the opening and placing sustained force on the spacers, thereby placing sustained force on the pressure plate, thereby compressing the partially cooked meat and extracting grease and excess liquids from the meat through the mesh basket and into the bottom of the container. A handle is provided to hold the container so as to pour out the grease and excess liquids through a flow conducting member, perhaps a spout.

19 Claims, 5 Drawing Sheets

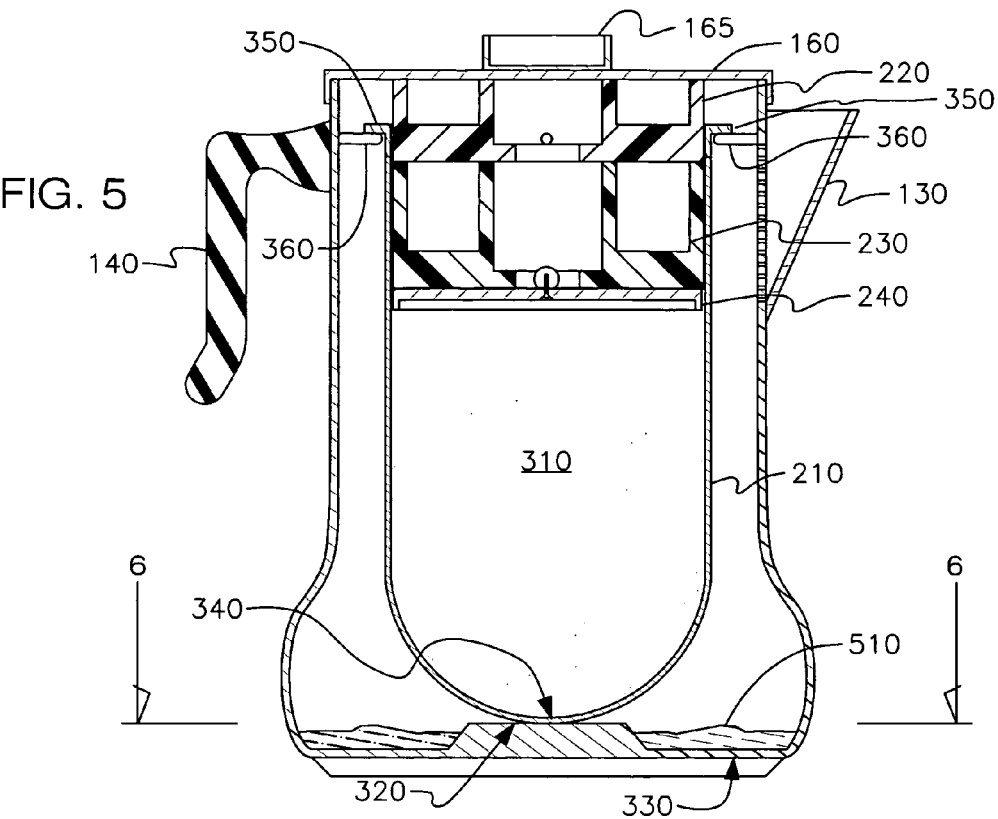
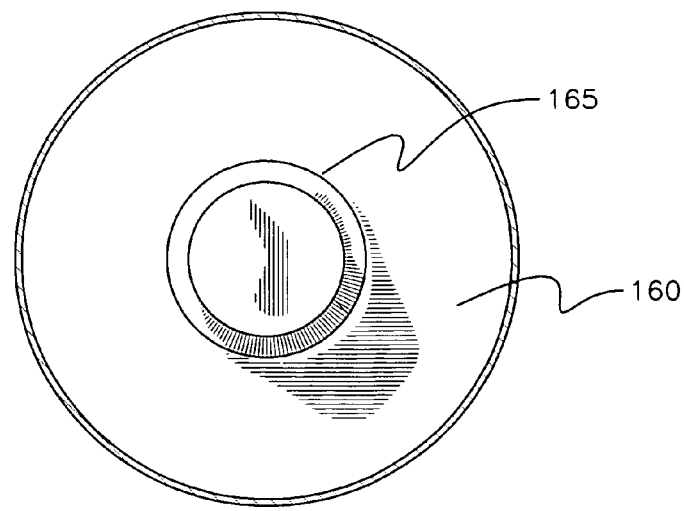

METHOD AND APPARATUS FOR REMOVING GREASE AND EXCESS LIQUID FROM MEAT

BACKGROUND OF THE INVENTION

1. Field of the Invention

This invention relates to a meat degreaser. More specifically, it refers to an apparatus for exerting pressure on partially cooked meat to remove grease and excess juices.

2. Description of the Prior Art

There is much concern regarding the intake of excess fat and grease. Excess fat and grease has been linked to obesity and other medical problems. In an attempt to reduce fat and grease, various devices have been developed to partially remove fat and grease from meat. For example, the Hamburger Degreaser illustrated in U.S. Pat. No. 5,419,250 to Ferguson has a container for holding a fully cooked hamburger with a draining plate at the bottom and a pressing component to place pressure on the fully cooked hamburger, thereby pressing out grease and fat from the fully cooked hamburger through the drain plate and into a storage compartment. This device is useful for hamburgers, but has several limitations, one being that it would be difficult to adapt to other meats such as steak, roasts, turkey and filets. Furthermore, its construction requires the hamburger to be completely cooked. Finally, pressure must be exerted continuously by a user in order to extract grease and fat, requiring the user to press on the meat for a sustained period of time.

What is needed is an apparatus for exerting sustained pressure on partially cooked meat to remove grease and excess liquids.

SUMMARY OF THE INVENTION

For the purposes of this application, grease and excess liquids will include any liquid components of the meat being processed. For example, grease, fat, blood components and water. Furthermore, partially cooked meat refers to any type of meat that has been cooked to any temperature or any level of doneness. For example, partially cooked meat may refer to a chicken breast that has been boiled for 1 minute, a portion of chop meat that has been fried until brown or a can of fully cooked tuna fish.

In one embodiment, an apparatus for removing grease and excess liquids from partially cooked meat is described, including a container having a closed bottom surface, an open top and an angular sidewall, also having an exterior and an interior surface and a top annular rim, the sidewall enclosing a cavity; a means for gripping the container mounted on the exterior surface; a means for conducting a flow of the grease and excess fluids from the container mounted on the exterior surface; and a lid adapted to seal tightly against the top annular rim. Configured to fit within the container is a mesh basket for holding the partially cooked meat and a pressure plate configured to apply sustained force to the partially cooked meat thereby pressing the grease and excess liquids from the partially cooked meat. In some embodiments, spacers are provided to fill the void between the top of the partially cooked meat and the lid, so that various quantities of partially cooked meat may be placed in the mesh basket on top of the pressure plate, preferably extending above the top annular rim, possibly by an inch or so, thereby exerting sustained pressure on the partially cooked meat when the lid is closed and latched. Perhaps a small spacer may be used for a large quantity of partially cooked meat, for example 1.5 pounds of partially cooked hamburger meat and a larger spacer may be used for a smaller quantity of partially cooked meat, such as a 6 ounce can of tuna fish.

In another embodiment, an apparatus for removing grease and excess liquids from partially cooked meat is described including a container having an opening; a means for gripping the container mounted on an exterior surface of said container; a means for conducting a flow of the grease and excess fluids from the container mounted on the exterior surface; and a means for covering said opening with a lid. Configured to fit within the container is a mesh basket for holding the partially cooked meat. Also included is a pressure means consisting of a pressure plate configured to apply sustained force to the partially cooked meat thereby pressing the grease and excess liquids from the partially cooked meat.

In another embodiment, a method of removing grease and excess liquids from a partially cooked meat is described including placing said partially cooked meat in a mesh basket, placing the mesh basket into a container, placing a pressure plate into the mesh basket and covering the partially cooked meat, placing one or more spacers above the pressure plate whereby the top of the one or more spacers extends above the top of the container, placing a lid on top of the container, pressing down on the lid and latching it, thereby exerting a sustained pressure on the one or more spacers and on the pressure plate, thereby pressing grease and excess liquids from the partially cooked meat, and pouring the grease and excess liquids out of the container through a flow conducting member.

BRIEF DESCRIPTION OF THE DRAWINGS

The invention can be best understood by those having ordinary skill in the art by reference to the following detailed description when considered in conjunction with the accompanying drawings in which:

FIG. 5 illustrates a cut-out view of an embodiment of the present invention.

FIG. 6 illustrated a top view of a lid of an embodiment of the present invention.

DETAILED DESCRIPTION OF THE INVENTION

Figure 1:
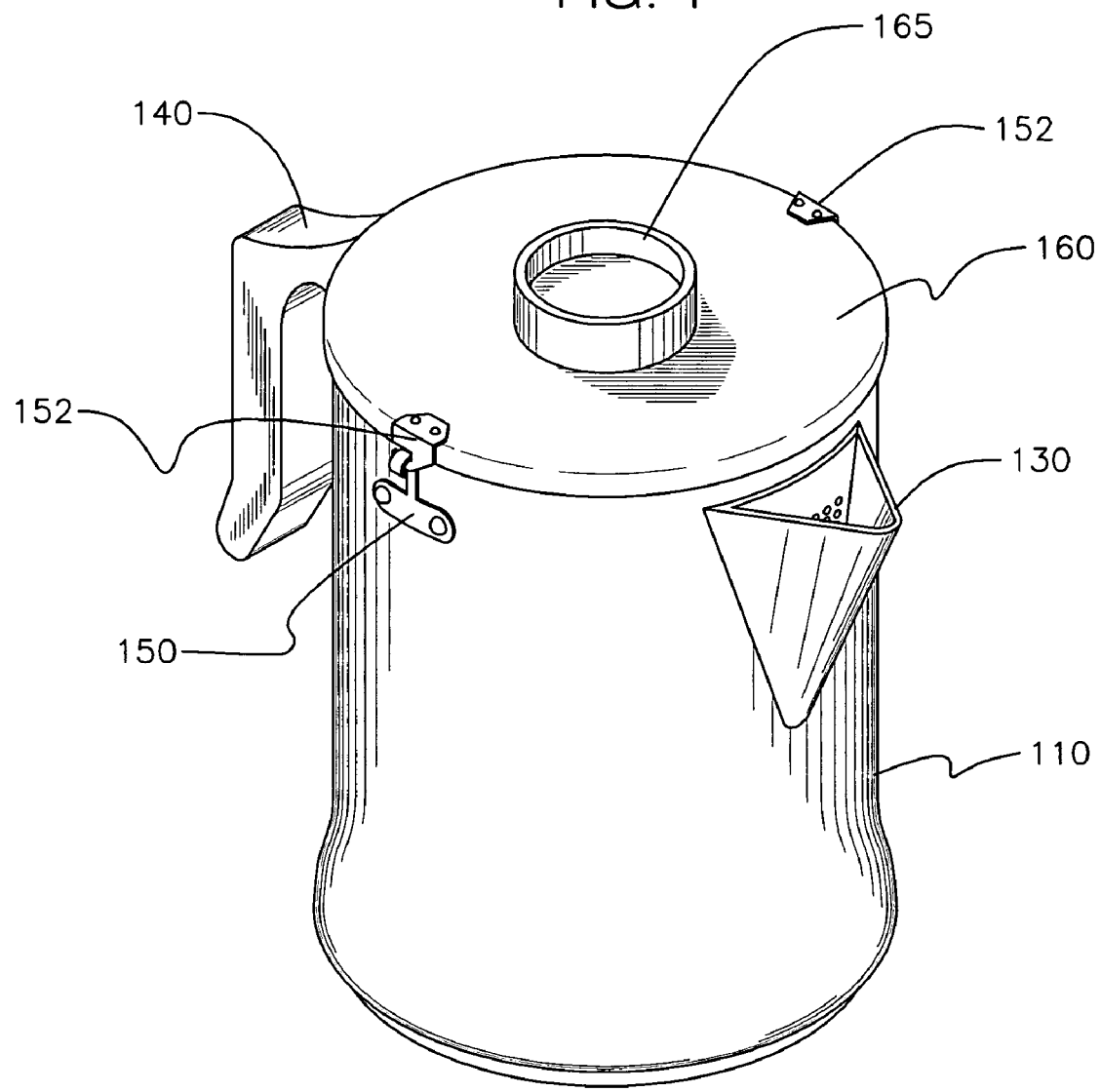
FIG. 1 illustrates an external view of an embodiment of the present invention.

Reference will now be made in detail to the presently preferred embodiments of the invention, examples of which are illustrated in the accompanying drawings. Throughout the following detailed description, the same reference numerals refer to the same elements in all figures.

Referring to FIG. 1, an external view of the present invention is shown. In this, a container 110 is shown having a lid 160 that may be secured to the container by a latch 150/152. In this embodiment, a twist latch is shown comprising a hook 150 and a receptor 152 that engage by placing the lid 160 onto the top rim of the container 110 and twisting the lid 160 until the hook 150 engages with the receptor 152. In other embodiments, other means known in the industry of securing the lid 160 to the container 110 may be used including, but not limited to, a retaining wires and pressure fits. A lid grip 165 may be included in some embodiments to help in placing and removing the lid 160. The container 110 may also have a grip 140 for gripping the container. Also shown is a flow conducting member or spout 130 to help direct the outward flow of grease and excess fluids through an opening in the side of the container 110.

Figure 2:
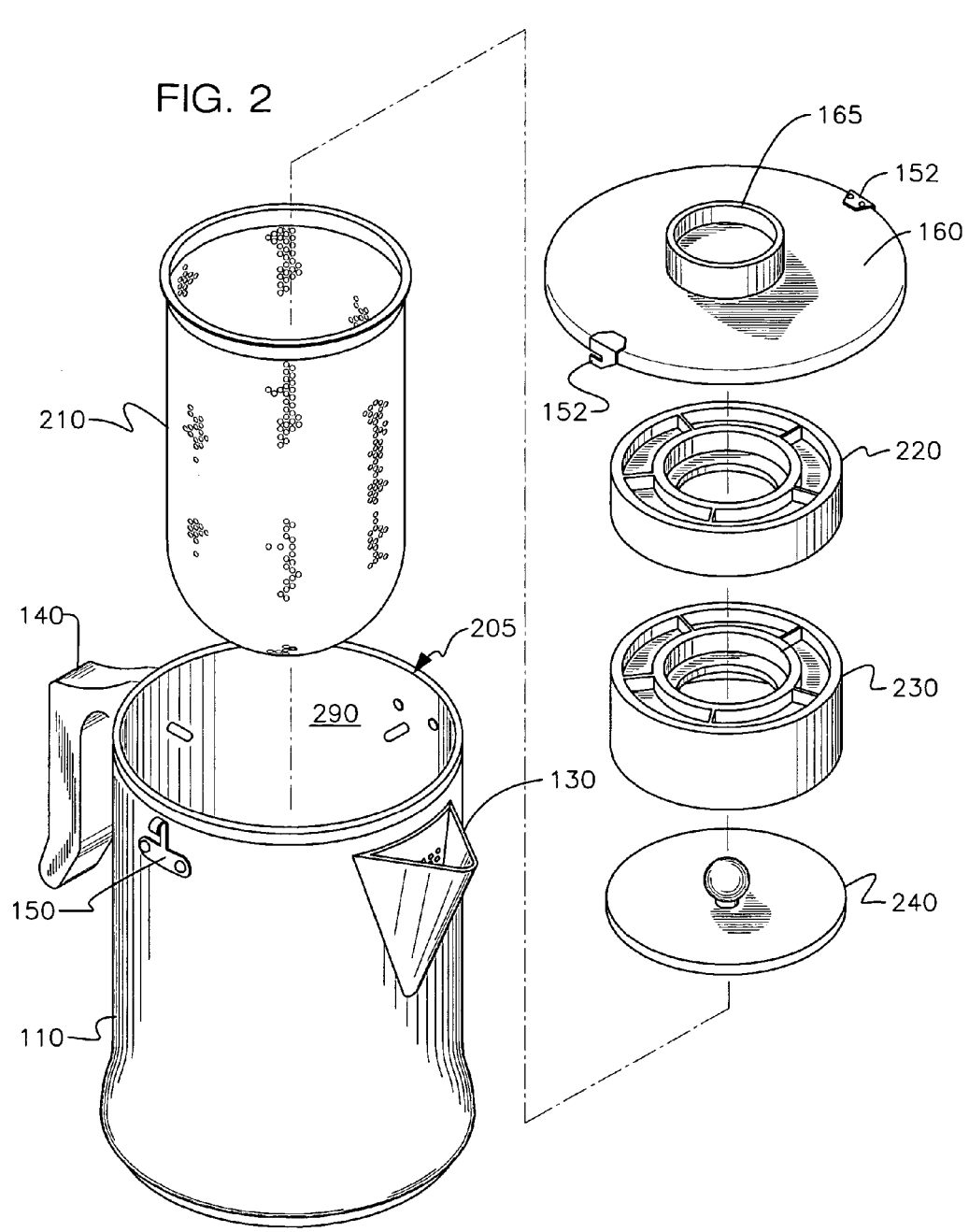
FIG. 2 illustrates an expanded view of an embodiment of the present invention.

Referring now to FIG. 2, an expanded view of the present invention is shown. In this the container 110 is shown having a lid 160 that may be secured to the container by a latch 150/152. In this embodiment, a twist latch is shown comprising a hook 150 and a receptor 152 that engage by placing the lid 160 onto the top rim of the container 110 and twisting the lid 160 until the hook 150 engages with the receptor 152. In other embodiments, other means known in the industry of securing the lid 160 to the container 110 may be used including, but not limited to, a retaining wires and pressure fits. A lid grip 165 may be included in some embodiments to help in placing and removing the lid 160. The container 110 may also have a grip 140 for gripping the container. Also shown is a flow conducting member or spout 130 to help direct the outward flow of grease and excess fluids from the container 110. In this view, a mesh basket 210 for holding partially cooked meat is shown. This basket may be constructed from a wire mesh such as used to form a kitchen strainer or colander or may be a perforated metal (or other sturdy material such as plastic or Teflon) container whereas the wire mesh or perforations are sized large enough to allow grease and excess juices to flow through the openings yet retain most of the meat. The basket is sized to fit within the container 110 and provide sufficient clearance from the interior surface 290 of the container 110 such that grease and excess juices may flow along the interior surface 290 of the container 110 when the container 110 is tilted.

Configured to fit within the mesh basket 210 is a pressure plate 240 for pressing against the partially cooked meat. It is preferred that the pressure plate 240 is a solid material, substantially disk-like in shape and having a diameter slightly smaller than the inside diameter of the mesh basket 210, such that it fits snuggly within the mesh basket 210. Configured to fit above the pressure plate 240 are one or more spacers (two are shown 220/230). The spacers are configured to fit within the mesh basket 210 and fill the void between the pressure plate 240 and the lid 160 when the lid 160 is closed. It is preferred that the spacer(s) extend above the top annular rim 205 of the container 110 before the lid 160 is closed, possibly an inch or so above the annular rim 205, thereby placing a sustained pressure on the contents of the mesh basket when the lid 160 is closed and latched. The spacers 220/230 may be substantially disk-like in shape and have a diameter smaller than the inside diameter of the mesh basket, though they may not fit as snuggly as the pressure plate 240.

Figure 3:
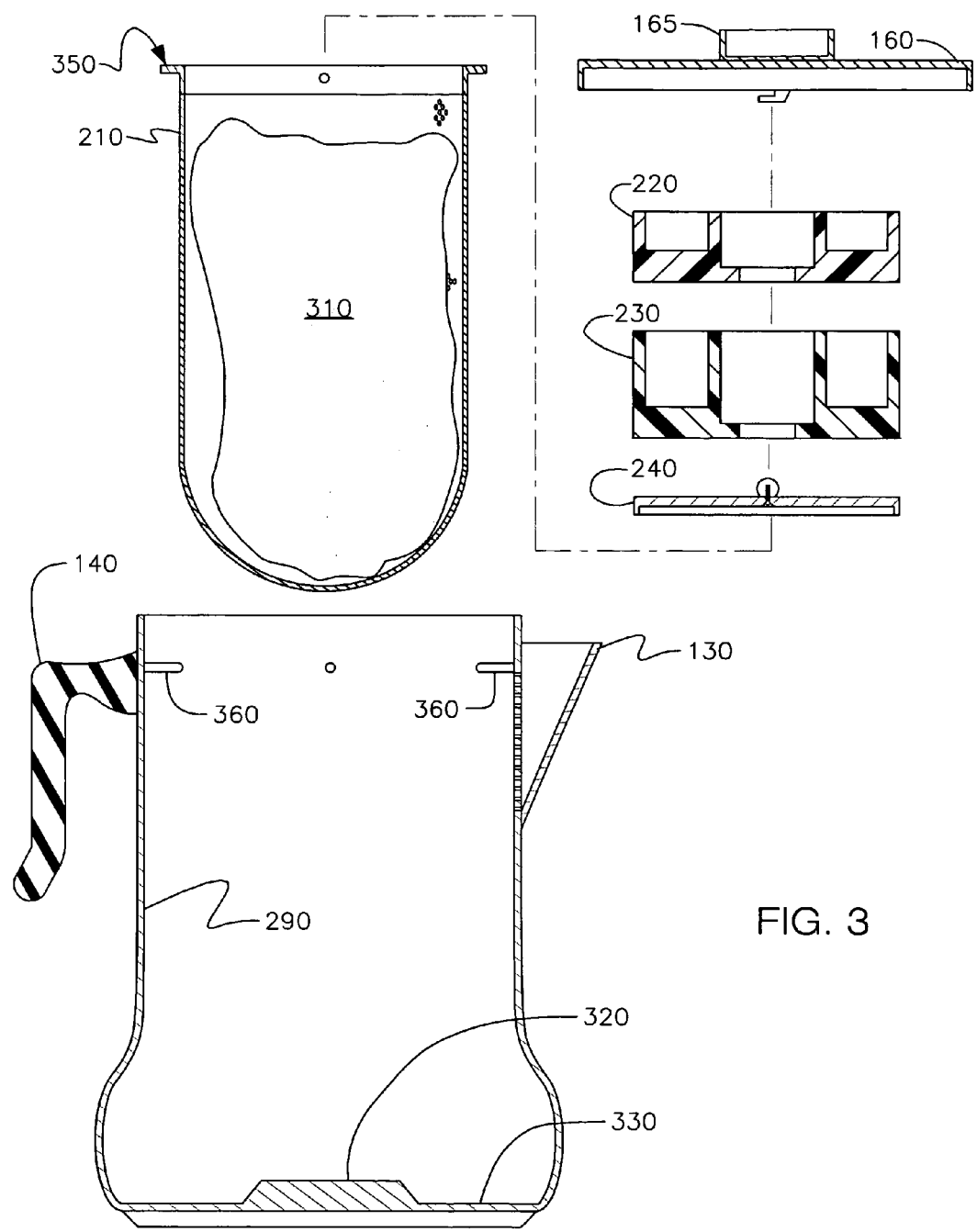
FIG. 3 illustrates an expanded view of an embodiment of the present invention.

Referring now to FIG. 3, an expanded view of the present invention is shown. In this the container 110 is shown having a grip 140 for gripping the container. Also shown is a flow conducting member 130 to help direct the outward flow of grease and excess fluids from the container 110. In this view, a mesh basket 210 for holding partially cooked meat 310 is shown. This basket may be constructed from a wire mesh such as used to form a kitchen strainer or colander or may be a perforated metal (or other sturdy material such as plastic) container whereas the wire mesh or perforations are sized large enough to allow grease and excess juices to flow through the openings yet retain most of the meat. The basket is sized to fit within the container 110 and provide sufficient clearance from the interior surface 290 of the container 110 such that grease and excess juices may flow along the interior surface 290 of the container 110 when the container 110 is tilted. In this embodiment, the mesh basket 210 has a lip 350 that engages with a stop 360 that extends from the inside surface of the container 110. The lip 350 and stop 360 may hold the mesh basket 210 at or above the bottom surface 330 of the container 110. In some embodiments, the bottom of the container 110 is raised slightly in the center, forming a raised bottom 320 for the mesh basket 210 to rest upon. Some embodiments may not have a lip 350 and stop 360 and rely only upon the raised bottom 320 to support the mesh basket 210. Some embodiments may not have the raised bottom 320 and only have a lip 350 and stop 360 to support the mesh basked 210. Some embodiments may have both the raised bottom 320 and the lip 350/stop 360 to provide extra support for the mesh basket 210.

Configured to fit within the mesh basket 210 is a pressure plate 240 for pressing against the partially cooked meat 310. It is preferred that the pressure plate 240 is a solid material, substantially disk-like in shape and having a diameter slightly smaller than the inside diameter of the mesh basket 210, such that it fits snuggly within the mesh basket 210. Configured to fit above the pressure plate 240 are one or more spacers (two are shown 220/230). The spacers are configured to fit within the mesh basket 210 and fill the void between the pressure plate 240 and the lid 160 when the lid 160 is closed. It is preferred that the spacer(s) extend above the top annular rim 205 of the container 110 before the lid 160 is closed, possibly an inch or so above the annular rim 205, thereby placing a sustained pressure on the partially cooked meat 310 that is held in the mesh basket when the lid 160 is closed and latched. The spacers 220/230 may be substantially disk-like in shape and have a diameter smaller than the inside diameter of the mesh basket, though they may not fit as snuggly as the pressure plate 240.

Figure 4:
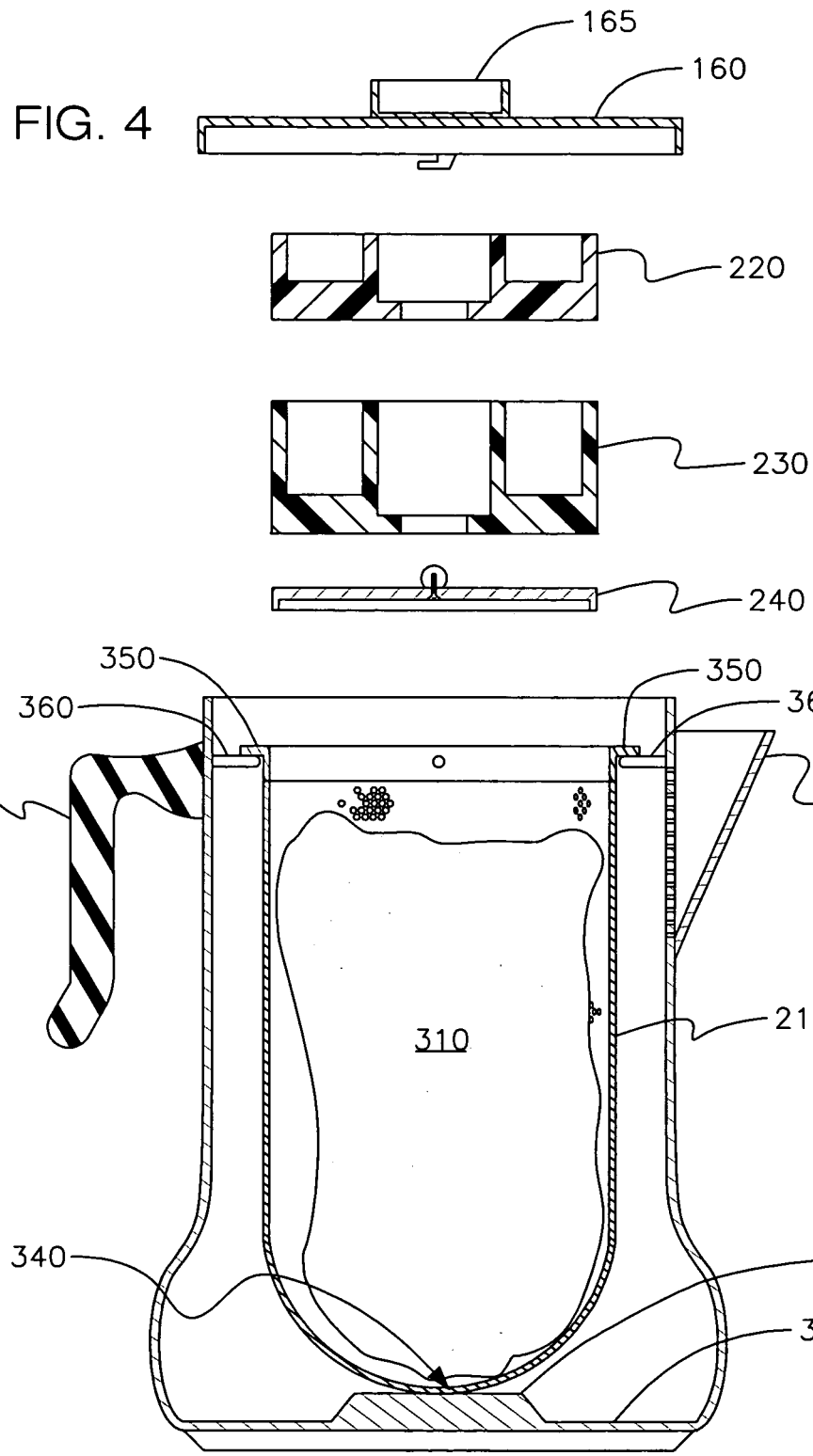
FIG. 4 illustrates a cut-out view of an embodiment of the present invention.

Referring now to FIG. 4, an expanded view of the present invention is shown with the mesh basket 210 inserted into the container 110. In this the container 110 is shown having a grip 140 for gripping the container. Also shown is a flow conducting member 130 to help direct the outward flow of grease and excess fluids from the container 110. In this view, a mesh basket 210 for holding partially cooked meat 310 is shown inserted into the container 110. This basket may be constructed from a wire mesh such as used to form a kitchen strainer or colander or may be a perforated metal (or other sturdy material such as plastic) container whereas the wire mesh or perforations are sized large enough to allow grease and excess juices to flow through the openings yet retain most of the meat. The basket is sized to fit within the container 110 and provide sufficient clearance from the interior surface 290 of the container 110 such that grease and excess juices may flow along the interior surface 290 of the container 110 when the container 110 is tilted. In this embodiment, the mesh basket 210 has a lip 350 that engages with a stop 360 that extends from the inside surface of the container 110. The lip 350 and stop 360 may hold the mesh basket 210 at or above the bottom surface 330 of the container 110. In some embodiments, the bottom of the container 110 is raised slightly in the center, forming a raised bottom 320 for the mesh basket 210 to rest upon. Some embodiments may not have a lip 350 and stop 360 and rely only upon the raised bottom 320 to support the mesh basket 210. Some embodiments may not have the raised bottom 320 and only have a lip 350 and stop 360 to support the mesh basked 210. Some embodiments may have both the raised bottom 320 and the lip 350/stop 360 to provide extra support for the mesh basket 210.

Configured to fit within the mesh basket 210 is a pressure plate 240 for pressing against the partially cooked meat 310. It is preferred that the pressure plate 240 is a solid material, substantially disk-like in shape and having a diameter slightly smaller than the inside diameter of the mesh basket 210, such that it fits snuggly within the mesh basket 210. Configured to fit above the pressure plate 240 are one or more spacers (two are shown 220/230). The spacers are configured to fit within the mesh basket 210 and fill the void between the pressure plate 240 and the lid 160 when the lid 160 is closed. It is preferred that the spacer(s) extend above the top annular rim 205 of the container 110 before the lid 160 is closed and optionally latched, possibly an inch or so above the annular rim 205, thereby placing a sustained pressure on the partially cooked meat 310 that is held in the mesh basket when the lid 160 is closed and latched. The spacers 220/230 may be substantially disk-like in shape and have a diameter smaller than the inside diameter of the mesh basket, though they may not fit as snuggly as the pressure plate 240.

Referring now to FIG. 5, an expanded view of the present invention is shown with the mesh basket 210 inserted into the container 110 and the lid 160 closed. In this the container 110 is shown having a grip 140 for gripping the container. Also shown is a flow conducting member 130 to help direct the outward flow of grease and excess fluids from the container 110. In this view, a mesh basket 210 for holding partially cooked meat 310 is shown inserted into the container 110 with a lip 350 engaged with a stop 360 that extends from the inside surface of the container 110 and the mesh basket 210 resting upon the raised bottom 320 to support it.

Shown in FIG. 5 within the mesh basket 210 is a pressure plate 240 for pressing against the partially cooked meat 310. Above the pressure plate 240 are two spacers 220/230 that are exerting a sustained pressure on the partially cooked meat 310, pressing out grease and excess liquids 510, thereby allowing the grease and excess liquids 510 to collect at the bottom of the container 110 and later be poured from the container 110 through the flow conducting member 130 when the container 110 is tilted.

Referring now to FIG. 6, a top view of the lid 160 of the present invention is shown with a grip 165. The lid 160 is preferably disk-shaped and is configured to fit tightly onto the top annular surface of the container 110, thereby substantially sealing the container so that grease and excess liquids 510 can flow out of the flow conducting member 130 without leaking between the lid 160 and the container 110. This seal will help in the use of the present invention, but, in some embodiments, may be a partial seal or a weak seal being that by slowly pouring the grease and excess liquids 510 out of the flow conducting member 130 may prevent the grease and excess liquids 510 from reaching the lid 160 and leaking between the lid 160 and the container 110.

Equivalent elements can be substituted for the ones set forth above such that they perform in substantially the same manner in the same way for achieving the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. An apparatus for removing grease and excess liquids from partially cooked meat using a sustained pressure comprising:

a container having a closed bottom surface, an open top and an angular sidewall having an exterior surface and an interior surface and a top annular rim, the sidewall enclosing a cavity;

a means for gripping the container mounted on the exterior surface;

a means for conducting a flow of the grease and excess fluids from the container mounted on the exterior surface;

a lid adapted to seal tightly against the top annular rim;

a mesh basket for holding the partially cooked meat, the mesh basket configured to fit within the container;

a pressure plate configured to fit within said mesh basket and apply force to the partially cooked meat thereby pressing the grease and excess liquids from the partially cooked meat; and at least one spacer adapted to fit between the lid and the pressure plate and extending above said top annular rim so as to exert a sustained pressure on said pressure plate in response to closing the lid.

2. The apparatus of claim 1, whereas said at least one spacer extends approximately one inch above the top annular rim before the lid is closed.

3. The apparatus of claim 1, further comprising at least one means for latching the lid to the container.

4. The apparatus of claim 1, whereas said mesh basket has a lip configured to rest on a stop, said stop attached to the interior surface of the container substantially near the top annular rim.

5. The apparatus of claim 1, whereas said mesh basket rests on a raised bottom surface of the container.

6. The apparatus of claim 1, whereas said means for gripping is a handle.

7. The apparatus of claim 1, whereas said means for conducting the flow of grease and excess fluids is a spout.

8. The apparatus of claim 1, whereas said pressure plate is a plastic disc.

9. An apparatus for removing grease and excess liquids from partially cooked meat using sustained pressure comprising:

a container means having an open top and a top annular rim;

a means for gripping the container mounted on an exterior surface of said container means;

a means for conducting a flow of the grease and excess fluids from the container mounted on the exterior surface;

a means for covering said open top with a lid configured to seal the container at the top annular rim;

a mesh basket for holding the partially cooked meat, the mesh basket configured to fit within the container means; and a sustained pressure means configured to apply force to the partially cooked meat thereby pressing the grease and excess liquids from the partially cooked meat whereas said pressure means includes a pressure plate and at least one spacer adapted to fit between the lid and the pressure plate and the at least one spacer extending above said opening so as to exert pressure on said partially cooked meat in response to closing the lid.

10. The apparatus of claim 9, whereas said pressure means includes a pressure plate and at least one spacer adapted to fit between the lid and the pressure plate and the at least one spacer extending above said opening so as to exert pressure on said partially cooked meat in response to closing the lid.

11. The apparatus of claim 10, whereas said at least one spacer extends approximately one inch above the opening before the lid is closed.

12. The apparatus of claim 9, further comprising at least one means for latching the lid to the container means.

13. The apparatus of claim 9, whereas said mesh basket has a lip configured to rest on a stop, said stop attached to the interior surface of the container means substantially near the opening.

14. The apparatus of claim 9, whereas said means for gripping is a handle.

15. The apparatus of claim 9, whereas said means for conducting the flow of grease and excess fluids is a spout.

16. The apparatus of claim 9, whereas said mesh basket rests on a raised bottom surface of the container means.

17. A method of removing grease and excess liquids from a partially cooked meat using sustained pressure comprising:
  placing said partially cooked meat in a mesh basket;
  installing the mesh basket into a container having an opening at top and a top annular rim;
  inserting a pressure plate into the mesh basket and covering the partially cooked meat;
  placing one or more spacers above the pressure plate whereby the top of the one or more spacers extends above the top of the top annular rim of the container;
  placing a lid over a top one of said one or more spacers, the lid configured to seal the container at the top annular rim after engaging with the container;
  pressing down on the lid, thereby exerting a sustained pressure on the one or more spacers and on the pressure plate, thereby pressing grease and excess liquids from the partially cooked meat; and
  pouring the grease and excess liquids out of the container through a flow conducting member.

18. The method of claim 17, whereas said one or more spacers extend approximately one inch above the top of the container before said pressing down.

19. The method of claim 17, further comprising latching said lid to said container.

\* \* \* \* \*